(12) United States Patent
Duffy et al.

(10) Patent No.: US 9,251,291 B2
(45) Date of Patent: Feb. 2, 2016

(54) DATA PARALLEL SEARCHING

(75) Inventors: John Duffy, Renton, WA (US); Edward G. Essey, Seattle, WA (US); Charles D. Callahan, II, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 567 days.

(21) Appl. No.: 11/947,539

(22) Filed: Nov. 29, 2007

(65) Prior Publication Data
US 2009/0144232 A1 Jun. 4, 2009

(51) Int. Cl.
*G06F 7/00* (2006.01)
*G06F 17/30* (2006.01)

(52) U.S. Cl.
CPC .... *G06F 17/30979* (2013.01); *G06F 17/30445* (2013.01)

(58) Field of Classification Search
CPC .................................................. G06F 17/30445
USPC ....................................................... 707/3, 655
See application file for complete search history.

(56) References Cited

U.S. PATENT DOCUMENTS

| 5,136,717 | A |   | 8/1992 | Morley et al. |
| 5,710,915 | A | * | 1/1998 | McElhiney ............................ 1/1 |
| 5,819,021 | A |   | 10/1998 | Stanfill et al. |
| 6,041,384 | A |   | 3/2000 | Waddington et al. |
| 6,167,393 | A | * | 12/2000 | Davis et al. ............................ 1/1 |
| 6,480,876 | B2 |   | 11/2002 | Rehg et al. |
| 6,675,189 | B2 |   | 1/2004 | Rehg et al. |
| 7,100,026 | B2 |   | 8/2006 | Dally et al. |
| 7,953,723 | B1 | * | 5/2011 | Dutton et al. ................. 707/707 |
| 2003/0187839 | A1 | * | 10/2003 | Zhang et al. ...................... 707/4 |
| 2006/0059173 | A1 | * | 3/2006 | Hirsch et al. ................... 707/100 |
| 2007/0136365 | A1 |   | 6/2007 | Tarditi, Jr. et al. |
| 2007/0143755 | A1 |   | 6/2007 | Sahu et al. |

OTHER PUBLICATIONS

"Microsoft's PLinq to Speed Program Execution", http://www.eweek.com/article2/0,1895,2009167,00.asp.
"Transactions for Memory", http://msdn.microsoft.com/msdnmag/issues/06/01/EndBracket/.
Blelloch, et al., "Multiscale Scheduling: Integrating Competitive and Cooperative Scheduling in Theory and in Practice", pp. 1-15.
Don Syme, "Leveraging .NET Meta-programming Components from F# Integrated Queries and Interoperable Heterogeneous Execution", Proceedings of the 2006 workshop on ML, Date: 2006, pp. 43-54, ACM Press, New York, USA.
Isard, et al., "Dryad: Distributed Data-Parallel Programs from Sequential Building Blocks", Date: Mar. 21-23, 2007, pp. 1-14.
Kuchen, et al., "The Integration of Task and Data Parallel Skeltons", p. 1-13.
"PLINQ—Parallel LINQ", http://www.opcode.co.uk/blog/index.php/2007/04/20/plinq-parallel-linq/.

* cited by examiner

*Primary Examiner* — Ajith Jacob
(74) *Attorney, Agent, or Firm* — Kevin Sullivan; Doug Barker; Micky Minhas

(57) ABSTRACT

A query that includes a search operator and that identifies an input data source is received. The input data source is partitioned into a plurality of partitions. A parallel search through the partitions is performed for an element that could halt the search. The parallel search is performed using a plurality of parallel workers. One of the parallel workers generates a notification when the element is found by that worker. The notification notifies the other parallel workers that the search could be halted. Each of the parallel workers generates an output set based on results of the search. The output sets are merged into a merged output set.

20 Claims, 11 Drawing Sheets

DATA PARALLEL SEARCHING

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that the same logical operation can utilize many processors at one time to thereby deliver better performance as more processors are added to the computers on which such software runs.

When parallelizing previously-written sequential algorithms, it is often desirable to keep as much of the previous sequential program behavior as possible. However, typical parallel execution of existing sequential logic introduces new behavioral characteristics and presents problems that can introduce challenges into the migration from sequential to parallel algorithms.

For example, for many operators, a parallel worker can typically operate on its own subset of input data independently, as though other parallel workers do not exist. However, for some operators, such as search operators, the output produced by some of the parallel workers may be dependent on the output of some of the other parallel workers, or useful in concluding the search sooner. Using conventional techniques for such operators can result in inefficient performance, as well as incorrect results.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a query that includes a search operator and that identifies an input data source is received. The input data source is partitioned into a plurality of partitions. A parallel search through the partitions is performed for an element that could halt the search. The parallel search is performed using a plurality of parallel workers. One of the parallel workers generates a notification when the element is found by that worker. The notification notifies the other parallel workers that the search could be halted, which may or may not be heeded immediately depending on the kind of search. Each of the parallel workers generates an output set based on results of the search. The output sets are merged into a merged output set.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
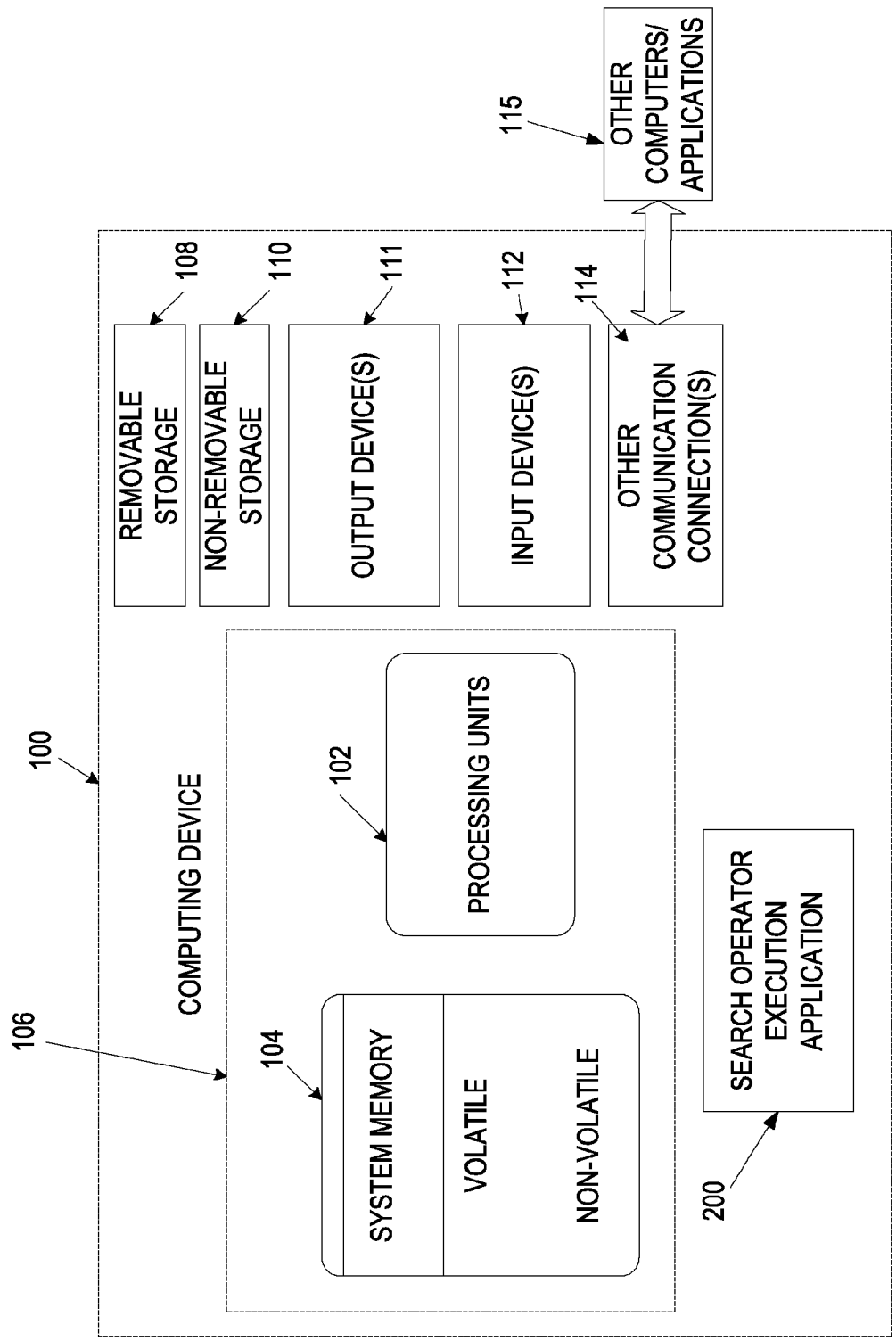
FIG. 1 is a block diagram illustrating a computer system according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs speculative and cooperative execution of search operators for data parallel operations, but the technologies and techniques described herein also serve other purposes in addition to these. In one implementation, one or more of the techniques described herein can be implemented as features within a framework program such as MICROSOFT® .NET Framework, or within any other type of program or service that handles data parallel operations in programs.

Data parallel systems typically operate by partitioning input data into disjoint subsets (partitions) so that independent tasks of execution may process the separate subsets in isolation. The partitions are processed in parallel to generate a plurality of output sets (e.g., the query is executed in parallel using the plurality of secondary partitions). The output sets are merged back into a merged output set. However, as mentioned above in the Background section, there is a certain class of operators that can be characterized as "search" operators. In such operators, the output produced by some of the parallel workers may be dependent on the output of some of the other parallel workers. In one embodiment, this type of operator is handled differently than other types of operators and the parallel workers communicate at several points during execution. In contrast, with most other types of operators, a parallel worker typically operates as though the other workers do not exist.

The following are some examples of search operators according to one embodiment. (1) ALL—evaluates a predicate function on each element in the input and returns true only if the predicate returned true for every single element. If any element yields false, a false is returned, which can happen at the first occurrence of a false predicate return value. (2) ANY—evaluates a predicate function on the input and returns true if the predicate returns true on any one element, and returns false if the predicate yields false for every element in the input. (3) CONTAINS—searches the input for a particular value, returning true if the value was found at least once and false otherwise. (4) FIRST—returns the first element from the input for which a predicate returns true. Note that if the predicate matches multiple elements, only the first one is returned. (5) LAST—returns the last element from the input for which a predicate returns true. Note that if the predicate matches multiple elements, only the last one is returned. (6) TAKEWHILE—outputs all elements in the input leading up to the first element for which a specified predicate returns false. (7) SKIPWHILE—outputs all elements in the input that occur after the first occurrence of an element for which a specified predicate returns false.

In one embodiment, all of these search operators share one common characteristic: there is a search phase, in which a particular element is sought in the input, followed by a production phase, in which one or more of the parallel workers produce output based on information found in the search phase. One approach is to perform the search sequentially and then the production. This approach does not provide parallel speedup. Another approach is to have each worker perform a local search and then integrate the results after all workers have finished. This approach may lead to more or less parallelism than an optimal solution, but may also lead to more wasted work.

One embodiment of an example system performs a parallel execution of a search operator by speculatively and cooperatively allowing workers to work ahead. The speculative aspect frees up more parallelism, while the cooperative aspect involves communication between the workers to help minimize the amount of wasted work that can result from speculation.

As illustrated in FIG. 1, an exemplary computer system that can be employed to implement one or more parts of an example system includes a computing device, such as computing device 100. In a basic configuration, computing device 100 typically includes processing units (i.e., processors) 102 and memory 104. Depending on the exact configuration and type of computing device, memory 104 may be volatile (such as RAM), non-volatile (such as ROM, flash memory, etc.), or some combination of the two. This basic configuration is illustrated in FIG. 1 by dashed line 106.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one implementation, computing device 100 includes search operator execution application 200. Search operator execution application 200 is described in further detail below with reference to FIG. 2.

Figure 2:
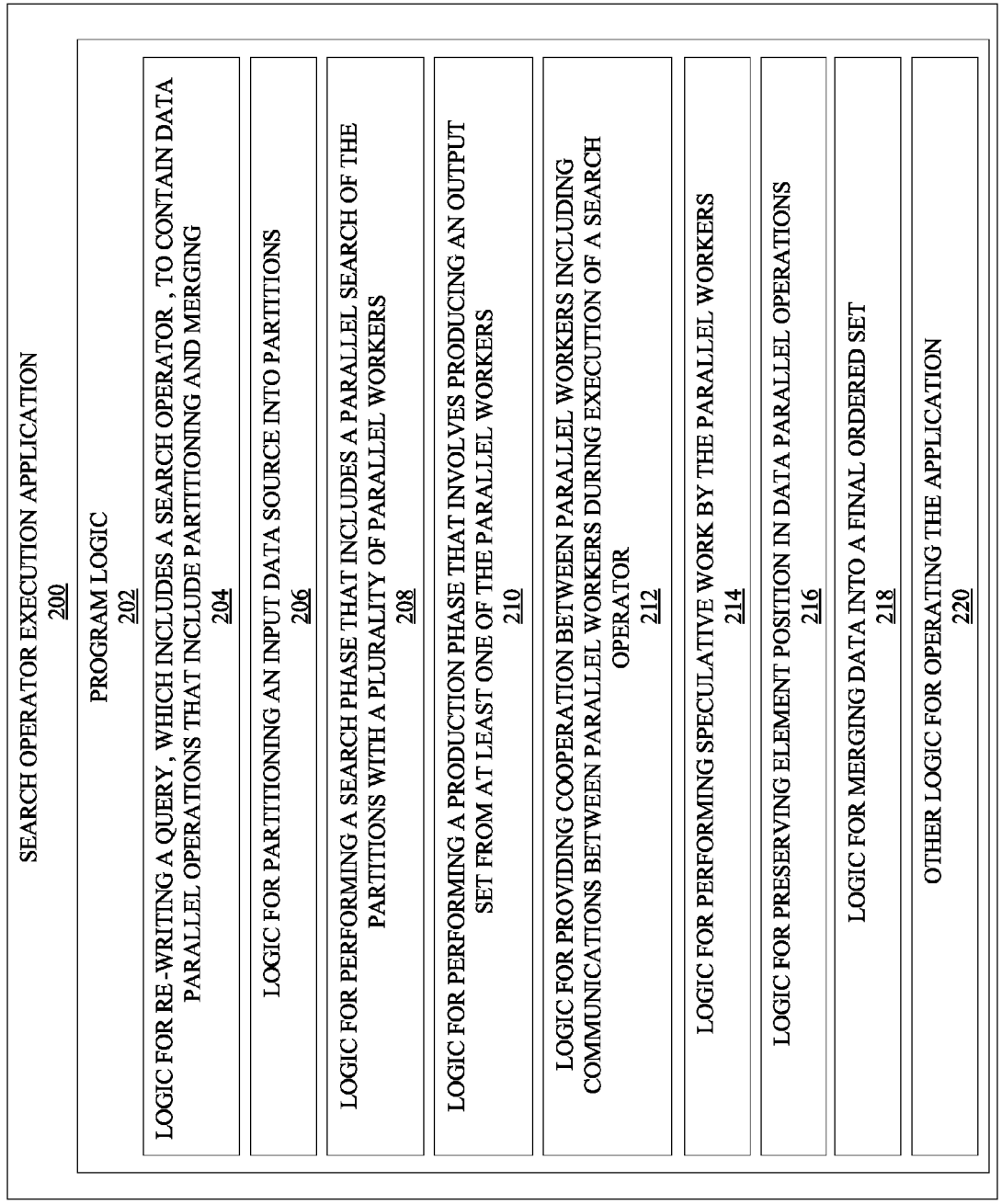
FIG. 2 is a diagrammatic view of a search operator execution application for operation on the computer system illustrated in FIG. 1 according to one embodiment.

FIG. 2 is a diagrammatic view of one embodiment of a search operator execution application 200 for operation on the computer device 100 illustrated in FIG. 1. Search operator execution application 200 is one of the application programs that reside on computing device 100. However, search operator execution application 200 can alternatively or additionally be embodied as computer-executable instructions on one or more computers and/or in different variations than illustrated in FIG. 1. Alternatively or additionally, one or more parts of search operator execution application 200 can be part of system memory 104, on other computers and/or applications 115, or other such suitable variations as would occur to one in the computer software art.

Search operator execution application 200 includes program logic 202, which is responsible for carrying out some or all of the techniques described herein. Program logic 202 includes logic for re-writing a query, which includes a search operator, to contain data parallel operations that include partitioning and merging 204; logic for partitioning an input data source into partitions 206; logic for performing a search phase that includes a parallel search of the partitions with a plurality of parallel workers 208; logic for performing a production phase that involves producing an output set from at least one of the parallel workers 210; logic for providing cooperation between parallel workers including communications between parallel workers during execution of a search operator 212; logic for performing speculative work by the parallel workers 214; logic for preserving element position in data parallel operations 216; logic for merging data into a final ordered set 218; and other logic for operating the application 220.

The term "query" as used herein is not limited to any one specific type of data parallel search operation, but rather is applicable to all types of data parallel searches. A "query" according to one embodiment includes, for example, any type of expression, program, statement, or computation, used in data parallel search operations.

Turning now to FIGS. 3-11 with continued reference to FIGS. 1-2, methods for implementing one or more implementations of search operator execution application 200 are described in further detail. In some implementations, the methods illustrated in FIGS. 3-11 are at least partially implemented in the operating logic of computing device 100.

Figure 3:
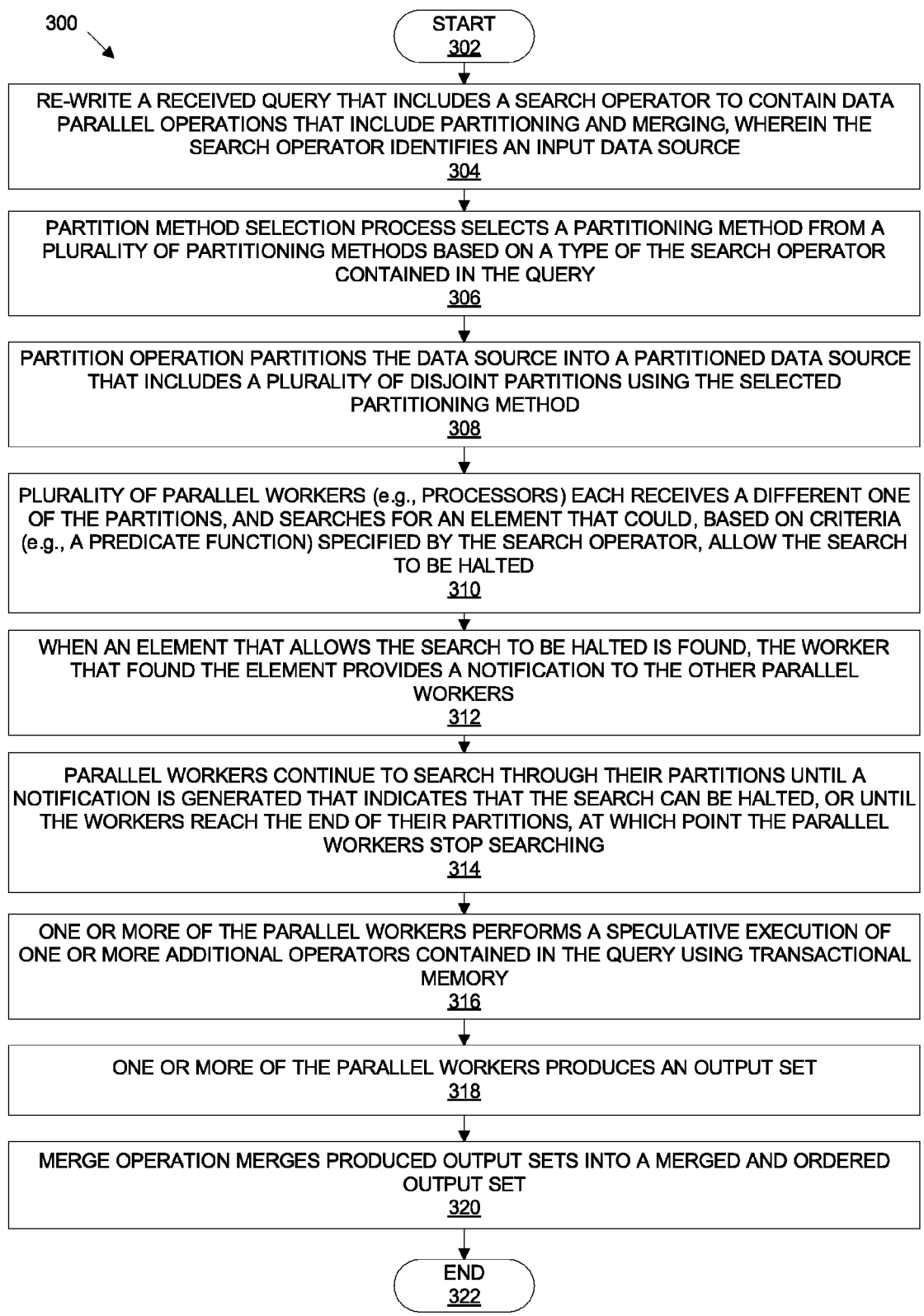
FIG. 3 is a high level flow diagram illustrating a method for executing a search operator according to one embodiment.

FIG. 3 is a high level flow diagram illustrating a method 300 for executing a search operator according to one embodiment. Method 300 begins at start point 302. At 304, a query including a search operator is received and is re-written to contain data parallel operations that include partitioning and merging, wherein the search operator identifies an input data source. At 306, a partition method selection process selects a partitioning method from a plurality of partitioning methods based on a type of the search operator contained in the query. At 308, a partition operation partitions the data source into a partitioned data source that includes a plurality of disjoint partitions using the partitioning method selected at 306. At 310, a plurality of parallel workers (e.g., processors) each receives a different one of the partitions, and searches for an element that could, based on criteria (e.g., a predicate function) specified by the search operator, allow the search to be halted (e.g., a potentially search-halting element).

At 312 in method 300, when an element that allows the search to be halted is found, the worker that found the element provides a notification to the other parallel workers. At 314, the parallel workers continue to search through their partitions until a notification is generated that indicates that the search can be halted, or until the workers reach the end of their partitions, at which point the parallel workers stop searching. At 316, one or more of the parallel workers performs a speculative execution of one or more additional operators contained in the query. In one embodiment, the speculative execution is performed using transactional memory. At 318, one or more of the parallel workers produces an output set. At 320, a merge operation merges produced output sets into a merged and ordered output set. Method 300 ends at end point 322.

As illustrated in FIG. 3, at 306 in method 300, a partition method selection process selects a partitioning method based on a type of the search operator contained in the query. As an example of this selection process, the SKIPWHILE operators according to one embodiment do not begin producing output data until the "first" occurrence of a false element has been discovered. Therefore, there is an incentive for the parallel workers to begin scanning input as close to the beginning as possible, and to advance through the input at roughly equal speeds. To implement this, a contiguous "striping" partitioning method may be selected at 306 for these types of search operators in one embodiment.

With striping partitioning according to one embodiment, each partition is formed out of contiguous chunks (e.g., sized to be a multiple of a cache-line), skipping over all other partitions' chunks to advance to its next chunk. For example, for an eight element input array and two partitions, and a chunk size of two, partitions would be assigned to elements in one embodiment as [0,0,1,1,0,0,1,1], where "0" means that the element is assigned to partition 0 (and is scanned by worker 0), and "1" means that the element is assigned to partition 1 (and is scanned by worker 1).

The striping pattern can be repeated for larger inputs, more partitions, etc. For example, for a twelve element input array and three partitions, and a chunk size of two, partitions would be assigned to elements in one embodiment as [0, 0, 1, 1, 2, 2, 0, 0, 1, 1, 2, 2]. In one embodiment, the number of contiguous elements each partition scans (i.e., chunk size) is selected based on cache line size, and partition segments are aligned on cache line boundaries. A rationale for using striping partitioning is that some search operators have the potential to be either very "front" or "back" heavy, and partitioning the input with ordinary contiguous partitions (e.g., [0, 0, 0, 0, 1, 1, 1, 1, 2, 2, 2, 2]) could lead to severe load imbalance among tasks. The striping partitioning method helps to ensure that all partitions make progress through the array at roughly equal speeds.

The following are examples of elements that would be searched for at 310 according to one embodiment: for an ALL operator, the workers search for an element that returns a false; for an ANY operator, the workers search for an element that returns a true; and for a TAKEWHILE operator, the workers search for an element that returns a false. For some operators, the first (or last) occurrence of an element that satisfies the criteria is located. For example, ANY and ALL are agnostic to position, but for TAKEWHILE and FIRST operators, the earliest element satisfying the criteria is located.

If the first occurrence of an element is desired, each worker that finds such an element provides a notification or announcement at 312 to the rest of the workers. The other workers make a determination whether to continue performing the search based on the notification. In one embodiment, all workers watch for notifications, but do not always terminate when they notice another worker has found an element. For example, a worker that has advanced past the element can terminate, but if a worker is still scanning before the announced element, the worker will continue the search to see if an element that matches the criteria exists before the already-discovered element. If the first occurrence of an element is not desired, any worker that finds an element matching the criteria announces it to all others and all of the workers can immediately stop the search phase.

After the search phase is complete, method 300 moves on to a production phase at 318. In one embodiment, these two phases are separated by a parallelism barrier. In the production phase at 318 according to one embodiment, workers yield or produce some set of elements from the input data. The production is specific to the type of search operator being executed. Some operators are "reductions" that return a single value, so that when the search is complete, a single answer is provided. For example, the ANY, ALL, and CONTAINS operators each produce a boolean true or false value. For these types of operators, in one embodiment, none of the searched elements are "remembered" (e.g., stored in a buffer of one of the workers).

For other types of search operators, in one implementation, a local buffer is provided for each worker to store scanned elements, and in the production phase, each worker yields some portion of the buffered input and, in some cases, some portion of the input that was not scanned (and not buffered) during the search phase. For example, after the search phase for a TAKEWHILE operator, the position of the first element for which the predicate yielded false will be known, and in the production phase, the workers can proceed to produce as output only those elements that occurred before the first such element (e.g., only elements stored in the local buffers). For a SKIPWHILE operator, on the other hand, according to one embodiment, the parallel workers may throw out much of the buffered data, produce output from the buffers only for workers that speculatively raced ahead of the found false element, and produce output based on the remaining unscanned input. In one embodiment, the buffer for each parallel worker is a circular queue that contains (element value, index) pairs. In one implementation, the buffers are bounded to help ensure that partitions do not get "too far ahead". Methods for performing a parallel execution of specific types of search operators according to specific embodiments are described in further detail below with reference to FIGS. 4-11.

As illustrated in FIG. 3, at 316 in method 300, one or more of the parallel workers performs a speculative execution of additional operators contained in the query using transactional memory. As mentioned above, in one embodiment of method 300, there is a barrier between the search and production phases. Such a barrier implies waiting. However, in one implementation, for operators that do not produce a single value, method 300 can move on to speculatively executing subsequent operators in the query tree. Method 300 determines what values would have been produced if the resolution after all workers searched was to yield all of the buffered output. This allows parallel workers to precompute answers in the search phase that would otherwise be computed only after all of the workers completed their search. For example, for the query "var q=a.TakeWhile((x)=>p(x)).Select((x)=>f (x))", if some set of the workers scan their entire input and then must wait, then the computation of f(x) for each such element must wait. In one embodiment, instead of waiting, a worker proceeds to computing f(x) for each element in its buffer prior to completion of the search by the other parallel workers.

In one embodiment, if any worker speculatively computes answers at 316 that should not have been computed, method 300 backs out the execution of that code (e.g., those transactions are aborted). In one embodiment, method 300 creates a set of transactions in transactional memory to contain some number of elements apiece, and tuned based on the overhead of having too many transactions versus the granularity of abort that is desired. The speculative computations are then run inside of the set of transactions in transactional memory.

As illustrated in FIG. 3, at 320 in method 300, a merge operation merges produced output sets into a merged and ordered output set. In one embodiment, method 300 uses ordinal order preservation. With ordinal order preservation according to one embodiment, the final query output is comprised of elements in strictly increasing ordinal position from the sources. This is implemented in one embodiment by tracking element indices during the various operations, using the element indices as sort keys, and sorting the data in ascending order using a heap-sort algorithm.

Figure 4:
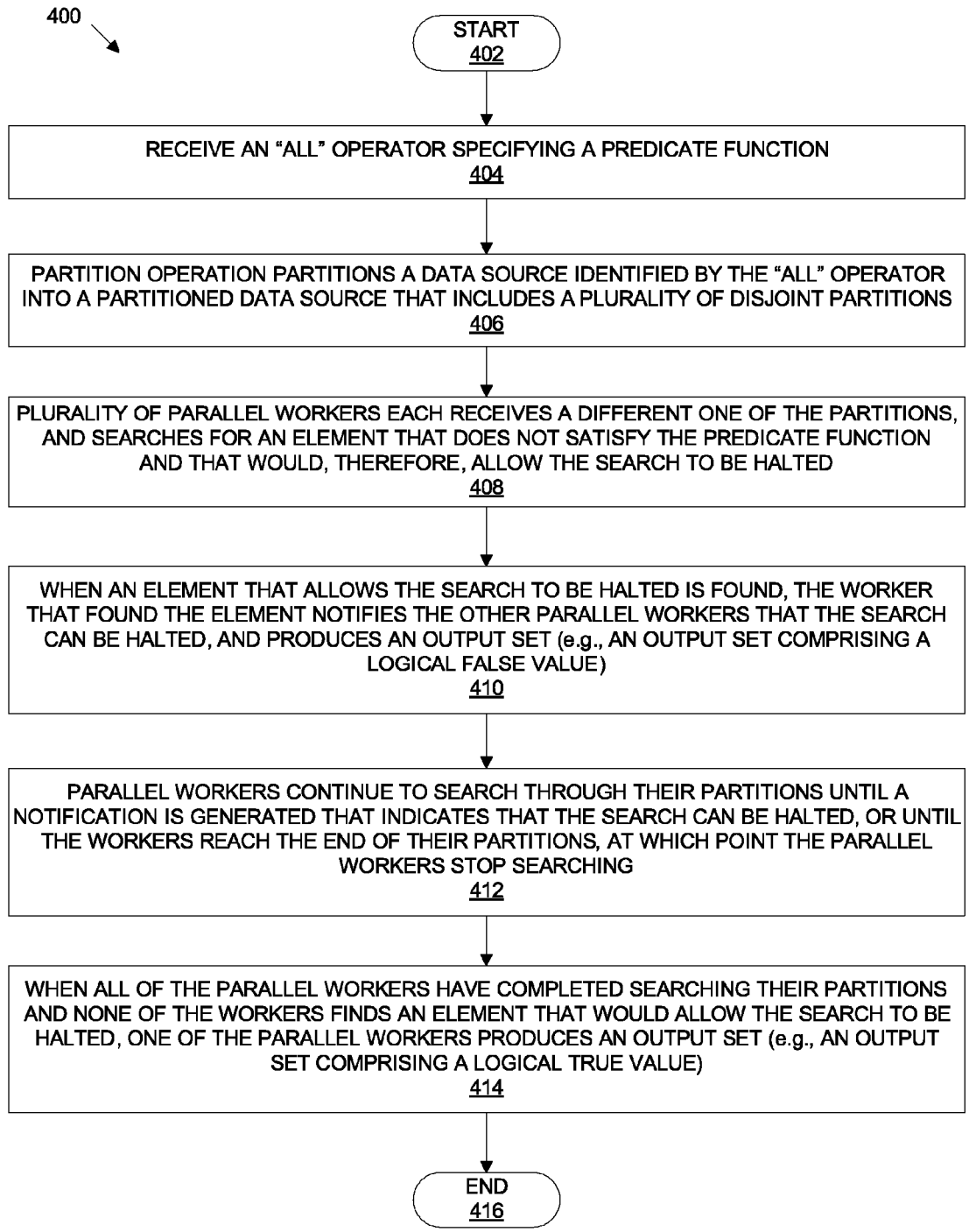
FIG. 4 is a flow diagram illustrating a method for performing a parallel execution of an ALL operator according to one embodiment.

FIG. 4 is a flow diagram illustrating a method 400 for performing a parallel execution of an ALL operator according to one embodiment. Method 400 begins at start point 402. At 404, an ALL operator specifying a predicate function is received. At 406, a partition operation partitions a data source identified by the ALL operator into a partitioned data source that includes a plurality of disjoint partitions. At 408, a plurality of parallel workers each receives a different one of the partitions, and searches for an element that does not satisfy the predicate function and that would, therefore, allow the search to be halted. At 410, when an element that allows the search to be halted is found, the worker that found the element notifies the other parallel workers that the search can be halted, and produces an output set (e.g., an output set comprising a logical False value). At 412, the parallel workers continue to search through their partitions until a notification is generated that indicates that the search can be halted, or until the workers reach the end of their partitions, at which point the parallel workers stop searching. At 414, when all of the parallel workers have completed searching their partitions and none of the workers finds an element that would allow the search to be halted, one of the parallel workers produces an output set (e.g., an output set comprising a logical True value). Method 400 ends at end point 416.

Figure 5:
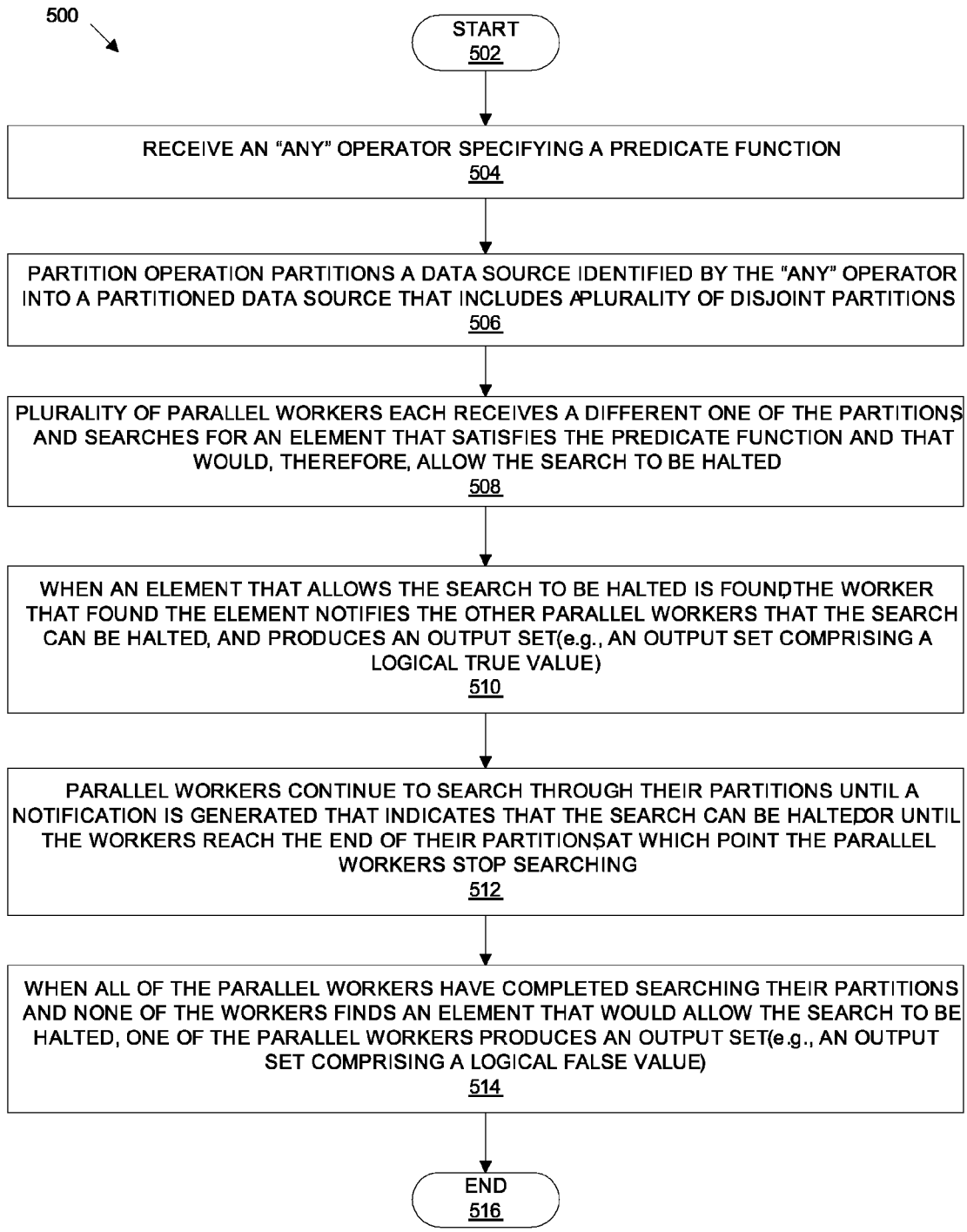
FIG. 5 is a flow diagram illustrating a method for performing a parallel execution of an ANY operator according to one embodiment.

FIG. 5 is a flow diagram illustrating a method 500 for performing a parallel execution of an ANY operator according to one embodiment. Method 500 begins at start point 502. At 504, an ANY operator specifying a predicate function is received. At 506, a partition operation partitions a data source identified by the ANY operator into a partitioned data source that includes a plurality of disjoint partitions. At 508, a plurality of parallel workers each receives a different one of the partitions, and searches for an element that satisfies the predicate function and that would, therefore, allow the search to be halted. At 510, when an element that allows the search to be halted is found, the worker that found the element notifies the other parallel workers that the search can be halted, and produces an output set (e.g., an output set comprising a logical True value). At 512, the parallel workers continue to search through their partitions until a notification is generated that indicates that the search can be halted, or until the workers reach the end of their partitions, at which point the parallel workers stop searching. At 514, when all of the parallel workers have completed searching their partitions and none of the workers finds an element that would allow the search to be halted, one of the parallel workers produces an output set (e.g., an output set comprising a logical False value). Method 500 ends at end point 516.

Figure 6:
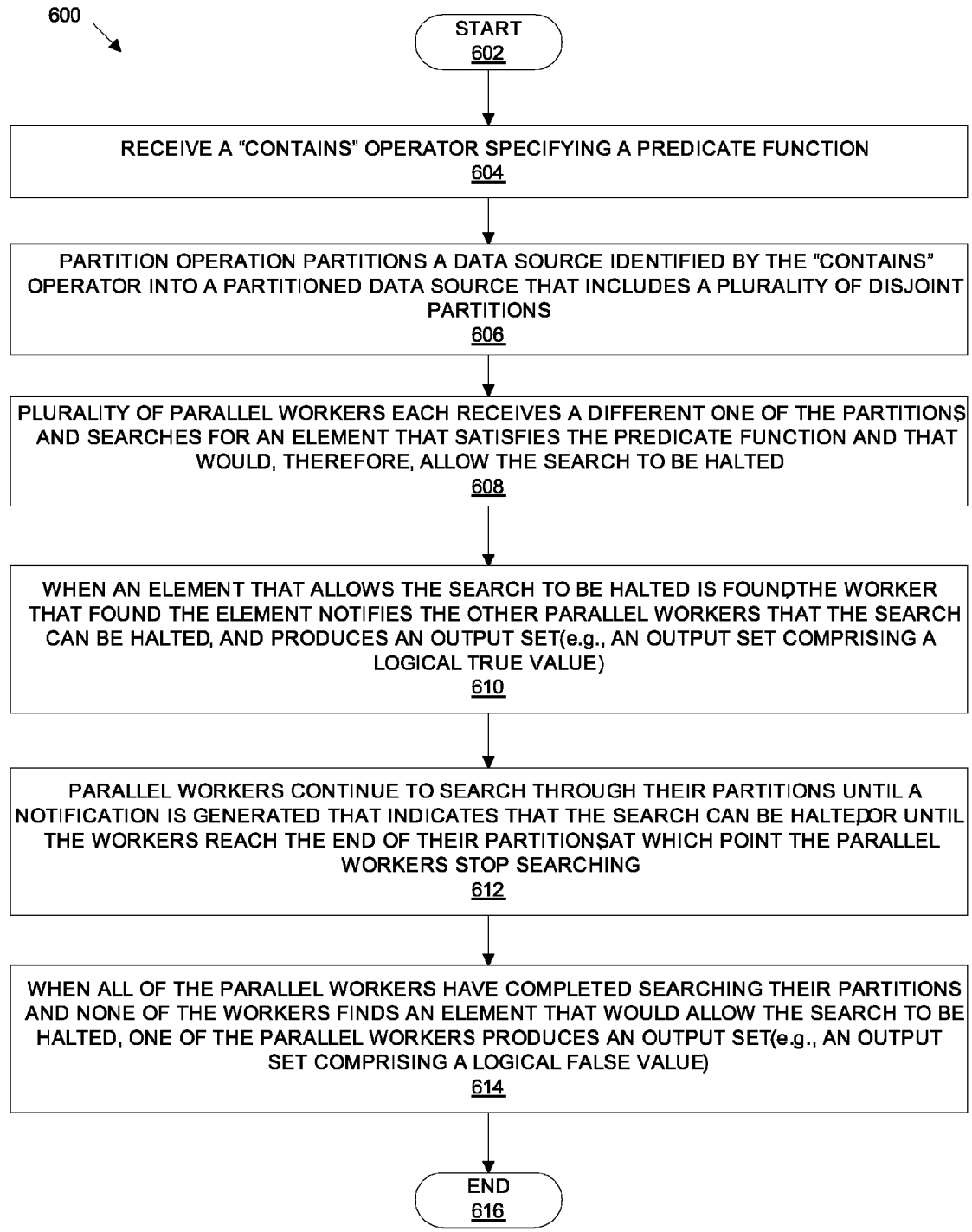
FIG. 6 is a flow diagram illustrating a method for performing a parallel execution of a CONTAINS operator according to one embodiment.

FIG. 6 is a flow diagram illustrating a method 600 for performing a parallel execution of a CONTAINS operator according to one embodiment. Method 600 begins at start point 602. At 604, a CONTAINS operator specifying a predicate function is received. At 606, a partition operation partitions a data source identified by the CONTAINS operator into a partitioned data source that includes a plurality of disjoint partitions. At 608, a plurality of parallel workers each receives a different one of the partitions, and searches for an element that satisfies the predicate function and that would, therefore, allow the search to be halted. At 610, when an element that allows the search to be halted is found, the worker that found the element notifies the other parallel workers that the search can be halted, and produces an output set (e.g., an output set comprising a logical True value). At 612, the parallel workers continue to search through their partitions until a notification is generated that indicates that the search can be halted, or until the workers reach the end of their partitions, at which point the parallel workers stop searching. At 614, when all of the parallel workers have completed searching their partitions and none of the workers finds an element that would allow the search to be halted, one of the parallel workers produces an output set (e.g., an output set comprising a logical False value). Method 600 ends at end point 616.

Figure 7:
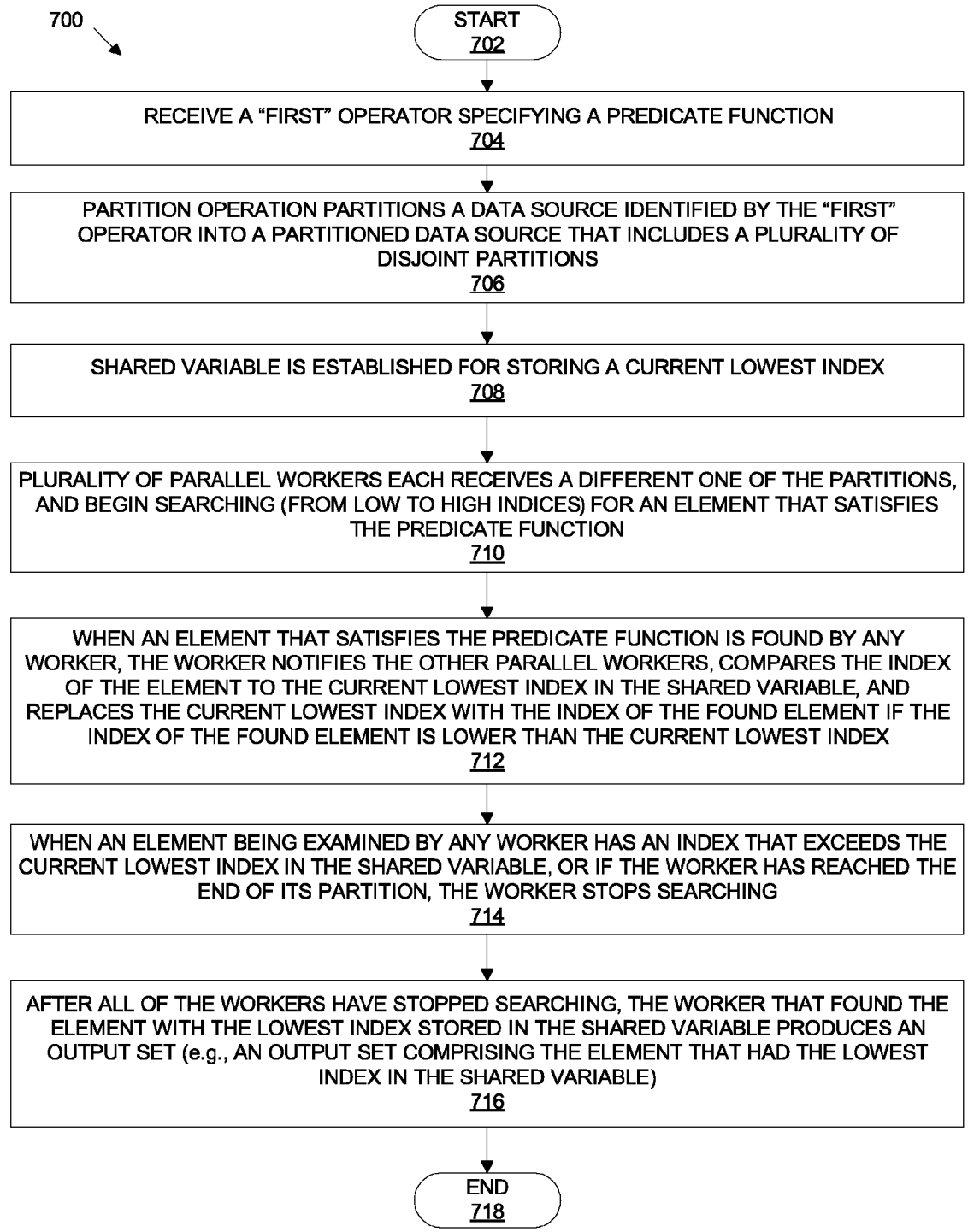
FIG. 7 is a flow diagram illustrating a method for performing a parallel execution of a FIRST operator according to one embodiment.

FIG. 7 is a flow diagram illustrating a method 700 for performing a parallel execution of a FIRST operator according to one embodiment. Method 700 begins at start point 702. At 704, a FIRST operator specifying a predicate function is received. At 706, a partition operation partitions a data source identified by the FIRST operator into a partitioned data source that includes a plurality of disjoint partitions. At 708, a shared variable is established for storing a current lowest index. At 710, a plurality of parallel workers each receives a different one of the partitions, and begins searching (from low to high indices) for an element that satisfies the predicate function. At 712, when an element that satisfies the predicate function is found by any worker, the worker notifies the other parallel workers, compares the index of the element to the current lowest index in the shared variable, and replaces the current lowest index with the index of the found element if the index of the found element is lower than the current lowest index. Thus, the worker selectively updates the index value of the shared variable based on the comparison. At 714, when an element being examined by any worker has an index that exceeds the current lowest index in the shared variable, or if the worker has reached the end of its partition, the worker stops searching. In one embodiment, each of the parallel workers makes a determination at 714 whether to continue performing the search based on the index of the element currently being examined by the worker and the current lowest index. At 716, after all of the workers have stopped searching, the worker that found the element with the lowest index stored in the shared variable produces an output set (e.g., an output set comprising the element that had the lowest index in the shared variable). Method 700 ends at end point 718.

Figure 8:
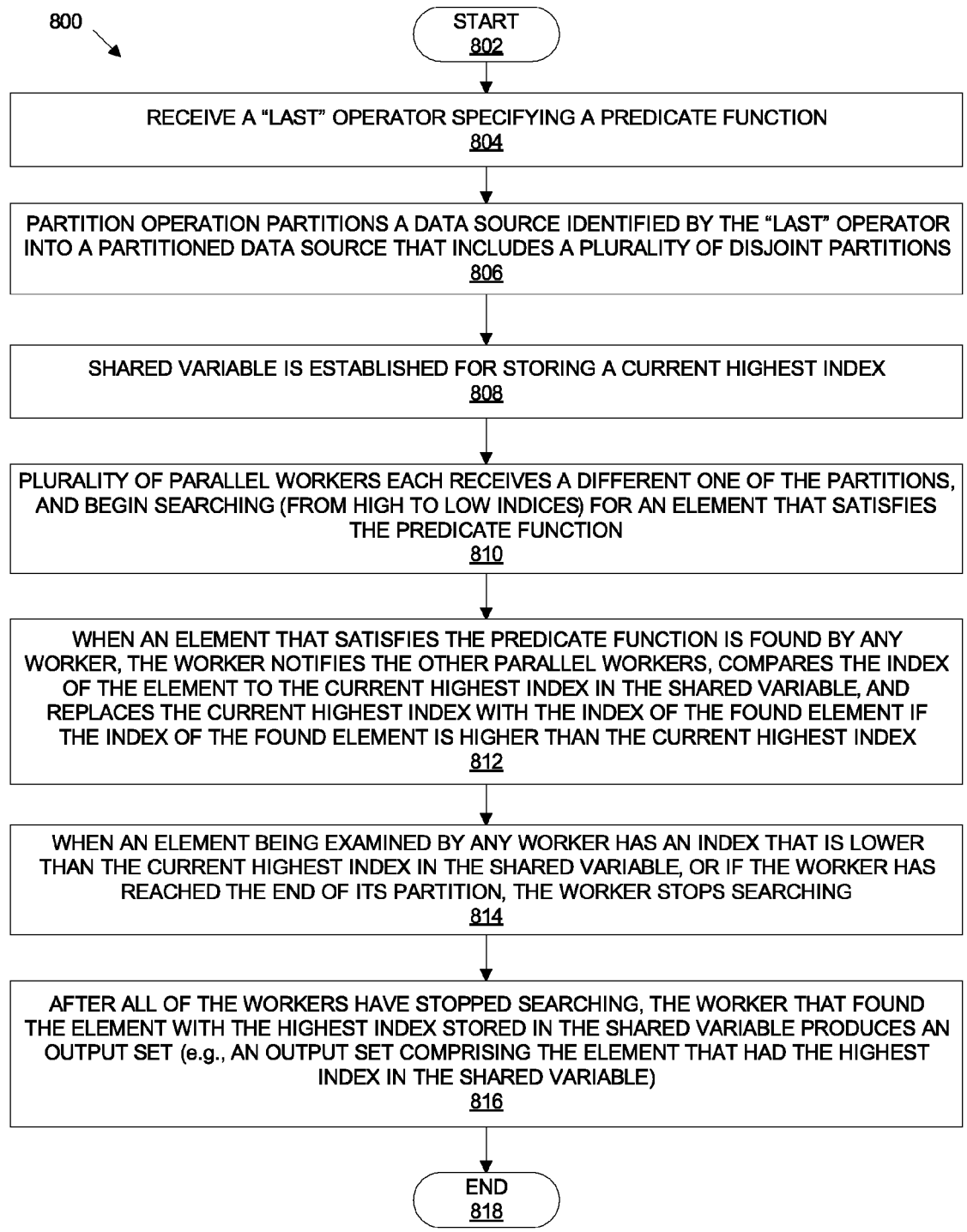
FIG. 8 is a flow diagram illustrating a method for performing a parallel execution of a LAST operator according to one embodiment.

FIG. 8 is a flow diagram illustrating a method 800 for performing a parallel execution of a LAST operator according to one embodiment. Method 800 begins at start point 802. At 804, a LAST operator specifying a predicate function is received. At 806, a partition operation partitions a data source identified by the LAST operator into a partitioned data source that includes a plurality of disjoint partitions. At 808, a shared variable is established for storing a current highest index. At 810, a plurality of parallel workers each receives a different one of the partitions, and begins searching (from high to low indices) for an element that satisfies the predicate function. At 812, when an element that satisfies the predicate function is found by any worker, the worker notifies the other parallel workers, compares the index of the element to the current highest index in the shared variable, and replaces the current highest index with the index of the found element if the index of the found element is higher than the current highest index. At 814, when an element being examined by any worker has an index that is lower than the current highest index in the shared variable, or if the worker has reached the end of its partition, the worker stops searching. In one embodiment, each of the parallel workers makes a determination at 814 whether to continue performing the search based on the index of the element currently being examined by the worker and the current highest index. At 816, after all of the workers have stopped searching, the worker that found the element with the highest index stored in the shared variable produces an output set (e.g., an output set comprising the element that had the highest index in the shared variable). Method 800 ends at end point 818.

Figure 9:
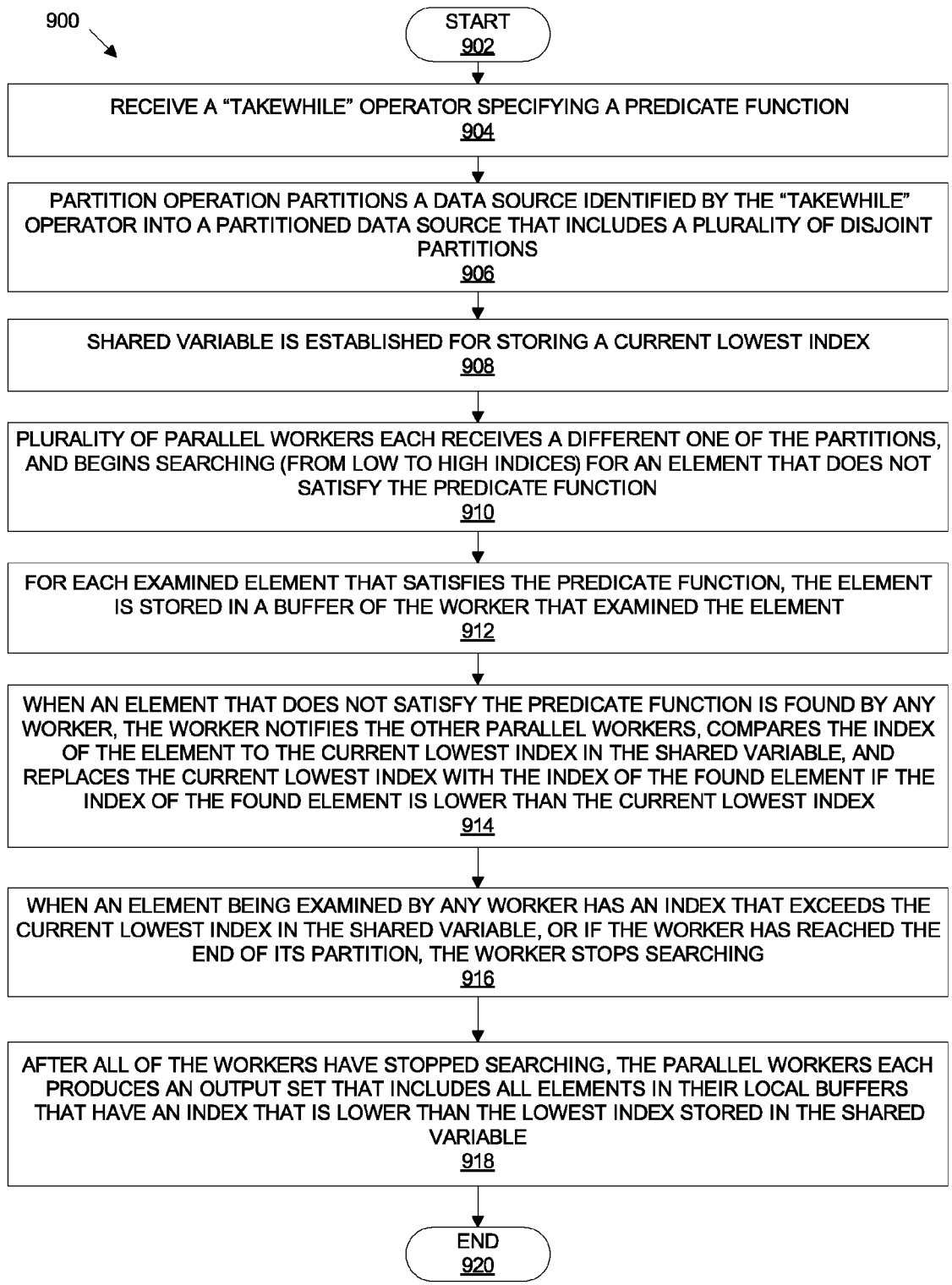
FIG. 9 is a flow diagram illustrating a method for performing a parallel execution of a TAKEWHILE operator according to one embodiment.

FIG. 9 is a flow diagram illustrating a method 900 for performing a parallel execution of a TAKEWHILE operator according to one embodiment. Method 900 begins at start point 902. At 904, a TAKEWHILE operator specifying a predicate function is received. At 906, a partition operation partitions a data source identified by the TAKEWHILE operator into a partitioned data source that includes a plurality of disjoint partitions. At 908, a shared variable is established for storing a current lowest index. At 910, a plurality of parallel workers each receives a different one of the partitions, and begins searching (from low to high indices) for an element that does not satisfy the predicate function. At 912, for each examined element that satisfies the predicate function, the element is stored in a buffer of the worker that examined the element. At 914, when an element that does not satisfy the predicate function is found by any worker, the worker notifies the other parallel workers, compares the index of the element to the current lowest index in the shared variable, and replaces the current lowest index with the index of the found element if the index of the found element is lower than the current lowest index. At 916, when an element being examined by any worker has an index that exceeds the current lowest index in the shared variable, or if the worker has reached the end of its partition, the worker stops searching. At 918, after all of the workers have stopped searching, the parallel workers each produce an output set that includes all elements in their local buffers that have an index that is lower than the lowest index stored in the shared variable. Method 900 ends at end point 920.

The TAKEWHILE operator yields all elements from the input a up to (and not including) the first element for which the user-specified predicate p evaluates to false (i.e., $p(a_i)$=false). Elements having an index value past the smallest such value for i are not yielded. Any work that "looks ahead" in the input past the smallest index under consideration is purely speculative, but does provide for parallelism.

Figure 10:
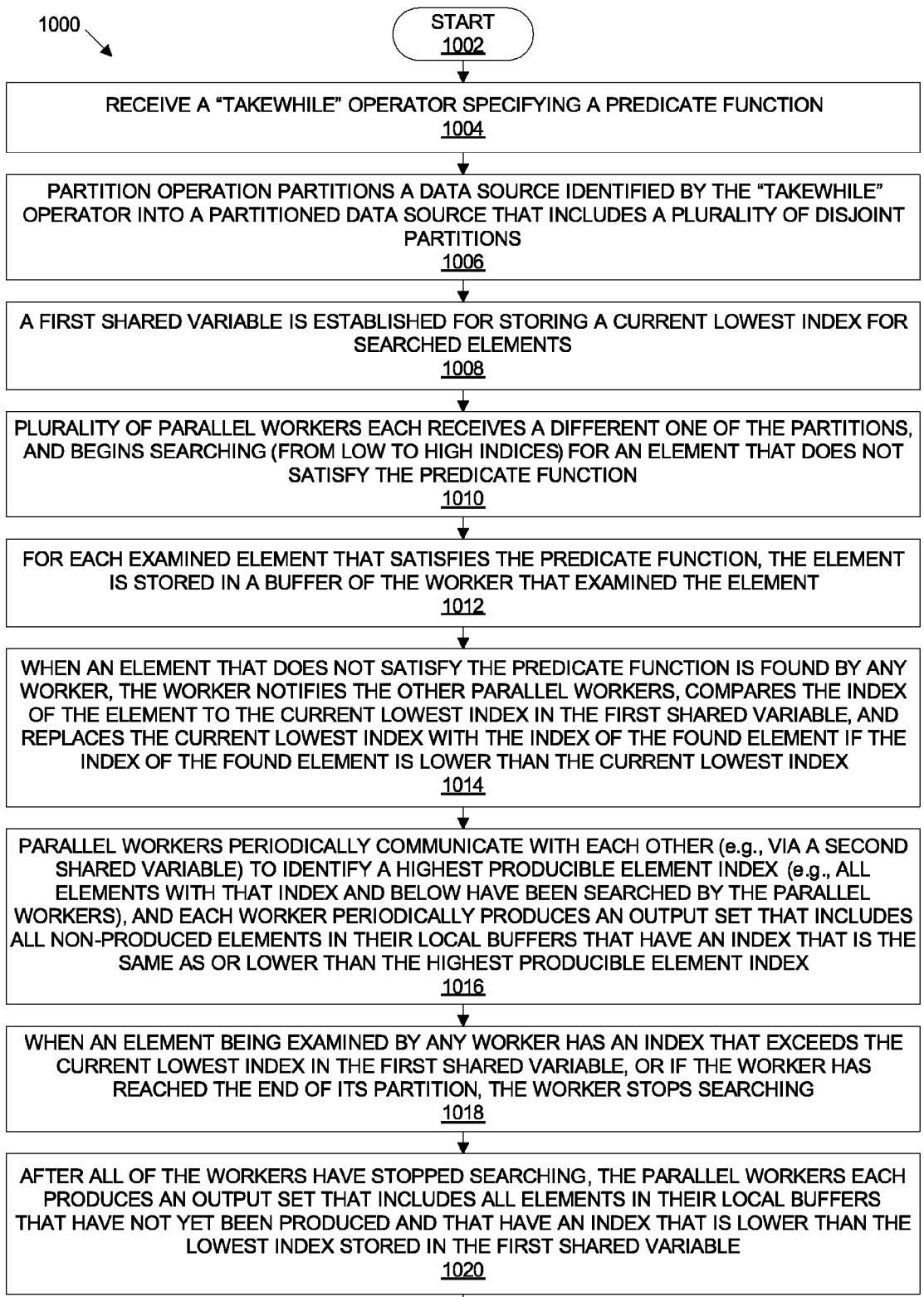
FIG. 10 is a flow diagram illustrating a method for performing a parallel execution of a TAKEWHILE operator according to one embodiment.

FIG. 10 is a flow diagram illustrating a method 1000 for performing a parallel execution of a TAKEWHILE operator according to one embodiment. Method 1000 begins at start point 1002. At 1004, a TAKEWHILE operator specifying a predicate function is received. At 1006, a partition operation partitions a data source identified by the TAKEWHILE operator into a partitioned data source that includes a plurality of disjoint partitions. At 1008, a first shared variable is established for storing a current lowest index for searched elements. At 1010, a plurality of parallel workers each receives a different one of the partitions, and begins searching (from low to high indices) for an element that does not satisfy the predicate function. At 1012, for each examined element that satisfies the predicate function, the element is stored in a buffer of the worker that examined the element.

At 1014 in method 1000, when an element that does not satisfy the predicate function is found by any worker, the worker notifies the other parallel workers, compares the index of the element to the current lowest index in the first shared variable, and replaces the current lowest index with the index of the found element if the index of the found element is lower than the current lowest index. At 1016, the parallel workers periodically communicate with each other (e.g., via a second shared variable) to identify a highest producible element index (e.g., all elements with that index and below have been searched by the parallel workers), and each worker periodically produces an output set that includes all non-produced elements in their local buffers that have an index that is the same as or lower than the highest producible element index. At 1018, when an element being examined by any worker has an index that exceeds the current lowest index in the first shared variable, or if the worker has reached the end of its partition, the worker stops searching. At 1020, after all of the workers have stopped searching, the parallel workers each produces an output set that includes all elements in their local buffers that have not yet been produced and that have an index that is lower than the lowest index stored in the first shared variable. Method 1000 ends at end point 1022.

For a TAKEWHILE operator, there is an additional optimization that is used in one embodiment, in which parallel workers switch back and forth between search and production phases to cut down on the overheads associated with buffering data. For example, if the query "var q=infiniteStream.TakeWhile((x)=>true).Take(1000)" is being evaluated, it is desirable to prevent the TAKEWHILE operator from triggering an out-of-memory problem or error, particularly because only 1,000 elements will be output by this query. To avoid this problem, according to one embodiment, a parallel worker in the search phase for a TAKEWHILE operator switches (e.g., temporarily) to the production phase if the worker knows that some of its buffered elements are located before the current element being looked at by all other workers (i.e., the worker determines that all elements leading up to an element in question yielded a predicate value of true).

Figure 11:
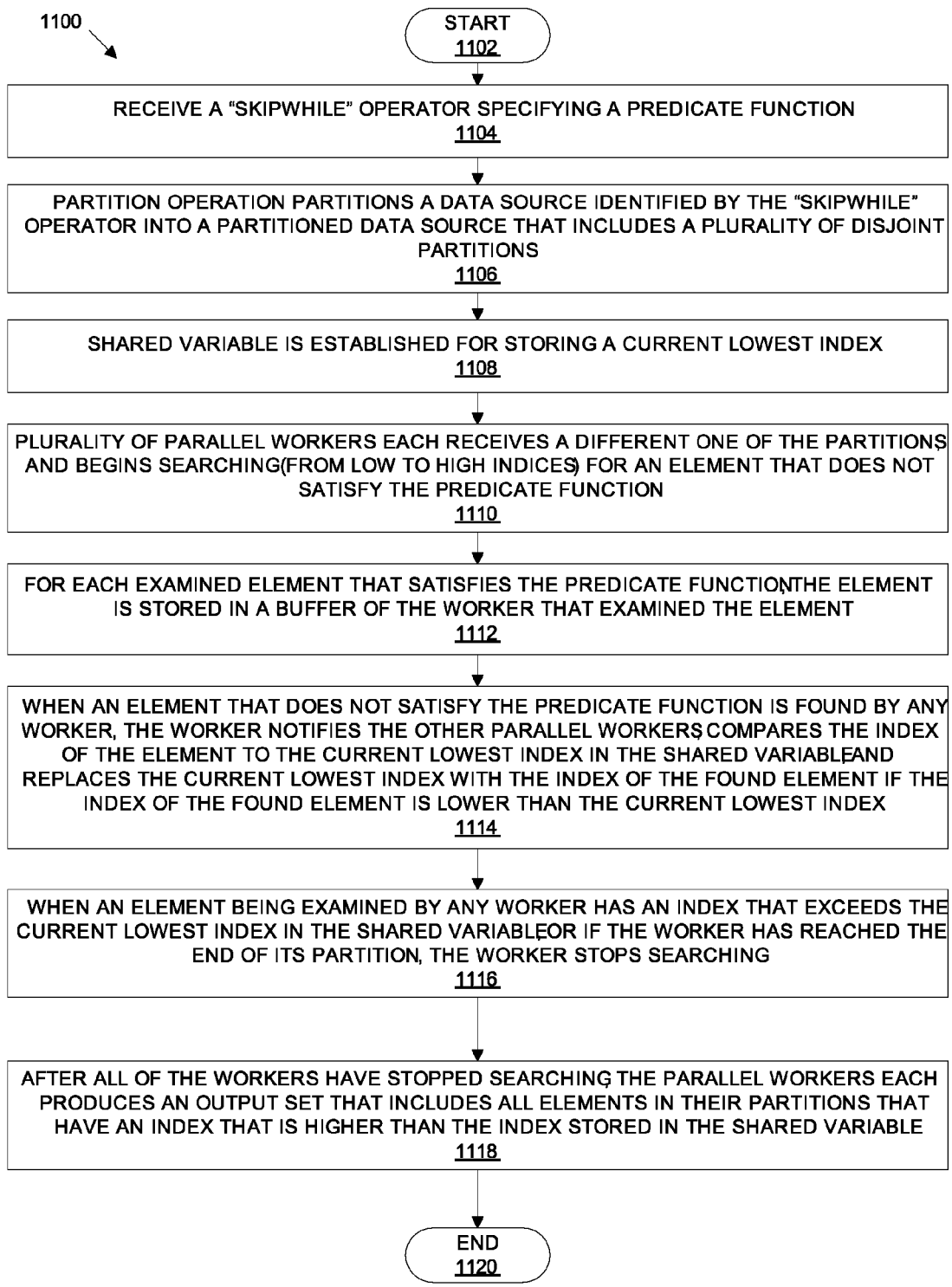
FIG. 11 is a flow diagram illustrating a method for performing a parallel execution of a SKIPWHILE operator according to one embodiment.

FIG. 11 is a flow diagram illustrating a method 1100 for performing a parallel execution of a SKIPWHILE operator according to one embodiment. Method 1100 begins at start point 1102. At 1104, a SKIPWHILE operator specifying a predicate function is received. At 1106, a partition operation partitions a data source identified by the SKIPWHILE operator into a partitioned data source that includes a plurality of disjoint partitions. At 1108, a shared variable is established for storing a current lowest index. At 1110, a plurality of parallel workers each receives a different one of the partitions, and begins searching (from low to high indices) for an element that does not satisfy the predicate function. At 1112, for each examined element that satisfies the predicate function, the element is stored in a buffer of the worker that examined the element. At 1114, when an element that does not satisfy the predicate function is found by any worker, the worker notifies the other parallel workers, compares the index of the element to the current lowest index in the shared variable, and replaces the current lowest index with the index of the found element if the index of the found element is lower than the current lowest index. At 1116, when an element being examined by any worker has an index that exceeds the current lowest index in the shared variable, or if the worker has reached the end of its partition, the worker stops searching. At 1118, after all of the workers have stopped searching, the parallel workers each produces an output set that includes all elements in their partitions that have an index that is higher than the index stored in the shared variable. Method 1100 ends at end point 1120.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
   receiving a query that includes a search operator and that identifies an input data source;
   partitioning the input data source into a plurality of partitions;
   performing a parallel search through the partitions for an element that could halt the search using a plurality of parallel workers that concurrently search the partitions;
   generating a notification with one of the parallel workers when the element is found by that worker, thereby notifying other parallel workers that the search could be halted; and
   making a determination with each of the other parallel workers whether to continue performing the search based on the generated notification.

2. The computer-readable medium of claim 1, wherein the method further comprises:
   generating an output set with each of the parallel workers based on results of the search, thereby generating a plurality of output sets; and
   merging the plurality of output sets into a merged output set.

3. The computer-readable medium of claim 1, wherein the method further comprises:
   stopping performance of the search by all of the parallel workers when the notification is generated.

4. The computer-readable medium of claim 1, wherein the method further comprises:
   making a determination with each of the other parallel workers whether to continue performing the search based on an index for the found element.

5. The computer-readable medium of claim 1, wherein the method further comprises:
   providing a plurality of partitioning methods;
   selecting one of the partitioning methods based on a type of the search operator; and
   partitioning the input data source into the plurality of partitions using the selected partitioning method.

6. The computer-readable medium of claim 5, wherein one of the plurality of partitioning methods comprises a striping partitioning method in which each partition is divided into a plurality of chunks that are searched in parallel by the plurality of workers.

7. The computer-readable medium of claim 6, wherein the striping partitioning method includes selecting a size of each of the plurality of chunks to be a multiple of a cache line size.

8. The computer-readable medium of claim 1, wherein the method further comprises:
   performing with at least one of the parallel workers a speculative execution of at least one additional operator contained in the query prior to completion of the search by all of the parallel workers.

9. The computer-readable medium of claim 8, wherein the speculative execution is performed using transactional memory.

10. The computer-readable medium of claim 1, wherein the search operator comprises an ALL search operator, wherein the notification is generated when one of the parallel workers finds an element that does not satisfy criteria specified by the ALL search operator, and wherein the notification causes the other parallel workers to stop searching.

11. The computer-readable medium of claim 1, wherein the search operator comprises one of an ANY search operator or a CONTAINS search operator, wherein the notification is generated when one of the parallel workers finds an element that satisfies criteria specified by the search operator, and wherein the notification causes the other parallel workers to stop searching.

12. The computer-readable medium of claim 1, wherein the search operator comprises one of a FIRST search operator or a LAST search operator, and wherein the method further comprises:
   providing a shared variable that is shared by the plurality of workers and that stores an index value for an element that satisfies criteria specified by the search operator;
   comparing an index for each element that satisfies criteria specified by the search operator to the index value of the shared variable; and
   selectively updating the index value of the shared variable based on the comparison.

13. The computer-readable medium of claim 12, wherein the method further comprises:
   comparing an index for an element currently being examined by one of the parallel workers to the index value of the shared variable; and
   determining whether the parallel worker will stop searching based on a result of the comparison for the element currently being examined.

14. The computer-readable medium of claim 1, wherein the search operator comprises one of a TAKEWHILE search operator or a SKIPWHILE search operator, and wherein the method further comprises:

providing a shared variable that is shared by the plurality of workers and that stores an index value for an element that does not satisfy criteria specified by the search operator;

comparing an index for each element that does not satisfy criteria specified by the search operator to the index value of the shared variable; and selectively updating the index value of the shared variable based on the comparison.

15. The computer-readable medium of claim 14, wherein the method further comprises:

storing each element that satisfies criteria specified by the search operator in a buffer of the worker that examined the element.

16. The computer-readable medium of claim 15, wherein the method further comprises:

comparing an index for an element currently being examined by one of the parallel workers to the index value of the shared variable; and determining whether the parallel worker will stop searching based on a result of the comparison for the element currently being examined.

17. A method for performing a parallel execution of a query, the method comprising:

receiving a search operator and that identifies an input data source;

partitioning the input data source into a partitioned data source comprising a plurality of partitions;

performing a parallel search through the partitions using a plurality of parallel workers that concurrently search the partitions;

providing a notification from a first one of the parallel workers to other parallel workers when the first parallel worker finds an element that could result in the search being halted; and making a determination with each of the other parallel workers whether to continue performing the search based on the notification.

18. The method of claim 17, and further comprising:

stopping performance of the search by all of the parallel workers when the notification is provided.

19. The method of claim 17, and further comprising:

making a determination with each of the other parallel workers whether to continue performing the search based on an index for the found element.

20. A computer-readable storage medium storing computer-executable instructions for performing a method comprising:

receiving a query that includes a search operator and that identifies an input data source;

partitioning the input data source into a plurality of partitions;

providing the plurality of partitions to a plurality of parallel workers, wherein each of the parallel workers is provided a different one of the partitions;

searching elements within the partitions concurrently with the plurality of parallel workers to identify an element that could result in the search being halted;

generating a notification with one of the parallel workers when a potentially search halting element is found by that parallel worker to notify other parallel workers of the found element; and making an independent determination with each of the other parallel workers whether to continue performing the search based on an index for the found element, wherein the independent determination made by each of the other parallel workers is made in response to receiving the notification.

\* \* \* \* \*